United States Patent [19]

Roos et al.

[11] Patent Number: 4,474,684
[45] Date of Patent: Oct. 2, 1984

[54] ELASTOMERS WITH CORROSION INHIBITING PROPERTIES

[75] Inventors: Ernst Roos, Odenthal; Sigurd Behr, Monheim, both of Fed. Rep. of Germany

[73] Assignee: Bayer Aktiengesellschaft, Leverkusen-Bayerwerk, Fed. Rep. of Germany

[21] Appl. No.: 442,259

[22] Filed: Nov. 17, 1982

[30] Foreign Application Priority Data

Nov. 27, 1981 [DE] Fed. Rep. of Germany ....... 3147154

[51] Int. Cl.$^3$ ................................................ C09K 3/00
[52] U.S. Cl. ...................................... 252/392; 524/239
[58] Field of Search .................. 524/242, 239; 252/392

[56] References Cited

U.S. PATENT DOCUMENTS

| 3,717,599 | 2/1973 | Miyata . | |
|---|---|---|---|
| 4,051,066 | 9/1977 | Miksic et al. | 252/389 R |
| 4,263,167 | 4/1981 | Mago | 252/392 X |

FOREIGN PATENT DOCUMENTS 1259759 1/1972 United Kingdom .

*Primary Examiner*—Benjamin R. Padgett
*Assistant Examiner*—Matthew A. Thexton
*Attorney, Agent, or Firm*—Connolly and Hutz

[57] ABSTRACT

Elastomers with corrosion-inhibiting properties, characterized by containing a reaction product of an amine of the formula:

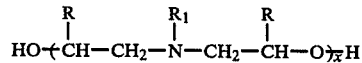

wherein
X represents a number from 5 to 30,
R denotes hydrogen or $C_1$–$C_6$ alkyl, and
$R_1$ denotes $C_1$–$C_{18}$ alkyl, $C_5$–$C_6$ cycloalkyl or $C_7$–$C_8$ aralkyl, with an aromatic carboxylic acid and optionally a fatty acid.

8 Claims, No Drawings

ELASTOMERS WITH CORROSION INHIBITING PROPERTIES

This invention relates to elastomers with corrosion-inhibiting properties which are obtained by adding to the elastomers compounds which prevent corrosion.

It is known that natural and synthetic elastomers promote corrosion on ferrous metals, non-ferrous metals and their alloys. It is assumed that this influence is due not so much to the polymer itself as to the large number of processing auxiliaries with which the elastomer comes into contact or which are added to the elastomer at the various stages of the polymerisation process, manufacture of the crude rubber including compounding, and cross-linking to form the finished article.

Particularly affected by this metal corrosion are mechanical apparatus containing rubber seals, sealing sleeves, O-rings or rings of rubber with metal inserts or wires containing galvanized, brass-plated or plain steel cord, in other words apparatus in which there is more or less close contact between metal and elastomer. The corrosive effect may be enhanced by other, external influences, such as the access of corrosive liquids or gases. It is well known, for example, that such adverse effects are produced by salt water, salt spray and engine exhaust gases, particularly when these act at elevated temperatures, e.g. inside the hood of motor vehicles.

There has therefore been no lack of attempts to find corrosion inhibitors to counteract these corrosive effects.

Corrosion inhibitors already proposed include inter alia alkali metal nitrites and alkali metal benzoates as well as fatty acids and amines and their salts. More recently, the use of salts of aromatic carboxylic acids and amines has been disclosed in U.S. Pat. No. 4,051,066 to inhibit corrosion of elastomers containing these salts.

The corrosion inhibitors hitherto proposed have certain deficiencies. Some of the substances, e.g. those disclosed in U.S. Pat. No. 4,051,066, are still too volatile or too readily soluble in water so that their corrosion-inhibiting effect is not sufficiently powerful or is lost too rapidly, others again are incompatible with the elastomers or their processing auxiliaries or form sticky surfaces on the articles containing them.

It has now been found that elastomers with excellent corrosion-inhibiting properties and free from the disadvantages described above may be obtained by adding to the elastomers effective quantities of a reaction product of an amine of the formula:

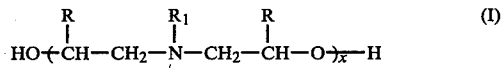

wherein
x = represents a number from 5 to 30,
R = denotes same or different hydrogen or $C_1-C_6$ alkyl, and
$R_1$ = denotes $C_1-C_{18}$ alkyl, $C_5-C_6$ cycloalkyl or $C_7-C_8$ aralkyl
with an aromatic carboxylic acid and optionally a fatty acid.

The effective quantities would be known to the man of the art or could easily be determined by simple experiments. From 0.1 to 10% by weight, in particular from 0.5 to 3% by weight, based on the elastomer, are preferably added.

The aromatic carboxylic acid and optionally fatty acid may be used in any proportions to the amine. The activity spectrum can be controlled by suitably varying the proportions. It has been found advantageous to use from 0.2 to 1 mol, in particular from 0.4 to 1 mol of aromatic carboxylic acid and from 0 to 0.8 mol, in particular from 0 to 0.6 mol. of fatty acid per nitrogen equivalent of amine in the reaction product.

The amine components which form the basis of these corrosion inhibitors are nitrogen-containing polycondensation products, hereinafter also referred to as basic polyethers. Their preparation has been described inter alia in German Auslegeschrift No. 1,495,835. The preferred method of preparation is a polycondensation of N,N-di-2-hydroxy alkylamines in the presence of an acid catalyst with elimination of water. It proceeds according to the following reaction scheme:

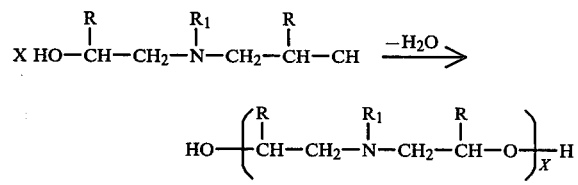

wherein X, R and $R_1$ have the meaning already indicated with reference to the general formula (I).

Particularly advantageous from a technical and economical point of view by virtue of their ready availability and low cost are those N,N-di-2-hydroxy alkylamines which are obtainable by the reaction of primary aliphatic, cycloaliphatic and araliphatic amines with $C_1-C_6$ alkylene oxides, preferably ethylene oxide (R=H) or propylene oxide (R=CH$_3$). The following are example of suitable amines: methylamine, ethylamine, propylamine, isopropylamine, n-, iso-, sec-, and tertiary-butylamine, amylamine, hexylamine, 2-ethylhexylamine, decylamine, dodecylamine, tetradecylamine, stearylamine, cyclopentylamine, cyclohexylamine, 2-, 3-, and 4-methyl-cyclohexylamine, 3,3,5-trimethyl-cyclohexylamine, benzylamine and 2-phenylethylamine.

Aliphatic and cycloaliphatic amines, such as n-butylamine and cyclohexylamine, are preferred.

Polycondensation of the N,N-di-2-hydroxyalkylamines is carried out up to values of X=5 to 30, which corresponds to molecular weights of the basic polyether of about 500 to 5,000, depending on the amine and alkylene oxide component. Molecular weights in the range of from 800 to 2,000 (statistical molecular weight) are preferred.

Salt formation of the basic polymer with the aromatic, preferably $C_6-C_{12}$ carboxylic acids and optionally with saturated or unsaturated, preferably $C_8-C_{20}$ fatty acids may be carried out by simply mixing the components at normal or elevated temperatures and is suitably carried out after the polycondensation reaction, in the same reaction vessel.

Suitable aromatic carboxylic acids may be represented by the formula:

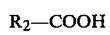

wherein $R_2$ denotes an aryl group, preferably $C_6-C_{12}$ aryl, optionally mono or di-substituted by $C_1-C_6$ alkyl, hydroxyl or nitro. One or two additional carboxyl groups may also be present.

The following are suitable aromatic carboxylic acids: benzoic acid, o-, m- and p-methyl-benzoic acid, 4-tertiary butyl-benzoic acid, 4-phenyl-benzoic acid, o-, m- and p-nitrobenzoic acid, 3,5,-dinitro-benzoic acid, 4-methyl-3-nitrobenzoic acid, phthalic acid, isophthalic acid, terephthalic acid, 1-naphthalene-carboxylic acid, 1-hydroxy-benzoic acid and 1-hydroxy-2-naphthalene-carboxylic acid.

Benzoic acid is preferred.

The following are examples of suitable saturated or unsaturated, preferably $C_8$–$C_{20}$ fatty acids: 2-ethyl-hexanoic acid, decanoic acid, dodecanoic acid, tetradecanoic acid, hexadecanoic acid, octadecanoic acid, undecylenic acid, oleic acid, stearic acid, linoleic acid and linolenic acid. Mixtures of fatty acids may also be suitable, e.g. those obtained from the saponification of natural raw materials such as palm oil (coconut precursor fatty acids, coconut fatty acid mixtures), ground nut oil, cotton seed oil, soya bean oil, sunflower oil, rapeseed oil, lard and fish oils. Oleic acid and/or stearic acid are preferred.

The salts of the basic polyethers are generally more or less viscous liquids (oils) which can easily be homogeneously distributed in the elastomer. The simultaneous use of aromatic carboxylic acids and fatty acids in varying proportions of the reaction of salt formation particularly facilitates adaptation of the salt to the various requirements which may occur in the introduction and distribution of the salts in the various elastomers and in their practical application.

For practical considerations of production methods, it may be advisable in the case of solution elastomers to add the corrosion inhibitor to the solution of rubber before the solid rubber is isolated. In the case of rubbers prepared by the emulsion process or in the case of natural rubber latex it may be advantageous to add the corrosion inhibitor to the latex before coagulation to form the solid rubber. Owing to its oily consistency, the corrosion inhibitor may also be sprayed on rubber crumbs or sheets or added to the rubber in internal mixers or on rollers.

Since the proportions of aromatice carboxylic acids and fatty acid in the salts can be so widely varied, it is also possible to achieve optimal control of the processes of diffusion and other movement and hence also the intensity and duration of the corrosion-inhibiting effect in the elastomers containing the inhibitors.

Thus, whereas stearates or oleates of basic polyethers have virtually no corrosion-inhibiting action when used on their own, salts which in addition contain relatively small quantities (e.g. 0.2 mol per nitrogen equivalent) of benzoic acid have as much corrosion-inhibiting action as a salt of benzoic acid alone containing, for example, 0.4 or 0.6 mol of benzoic acid per nitrogen equivalent of the basic polyether.

The range of elastomers to which the salts may be added is subject to no restrictions and thus includes, for example, natural rubber, styrene-butadiene rubber, poly-butadiene, polyisoprene, polychloroprene, acrylonitrile-butadiene rubber, butyl rubber, ethylene-propylene rubber (EPM), ethylene-propylene-diene rubber (EPDM), silicone rubber, epichlorohydrin rubber, acrylate rubber and elastomers based on chlorinated or chlorosulphonated polyethylene and polyurethane elastomers. The above mentioned elastomers may be present either in compact form or as foams with closed or open cells and may contain the usual additives, including e.g. already known corrosion inhibitors.

To illustrate the invention, the preparation of some basic polyethers and of the corresponding salts and their corrosion-inhibiting effect in elastomers are described below.

1. Preparation of basic polyethers

Example 1.1

Basic polyether of N,N-di-2-hydroxypropyl-methylamine:

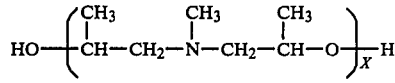

2,940 g (20 mol) of N,N-di-2-hydroxypropyl-methylamine and 15 g of 73% phosphorous acid ($H_3PO_3$) were condensed under a nitrogen atmosphere at 200 to 230° C. for 30 hours with the removal of 560 g of a water-amine mixture. A further 382 g of an amine-water mixture were subsequently distilled off at the same temperature under a reduced pressure of 20 mbar. 1,975 g of a yellow oil, $n_D^{20}$ 1.4670, OH number 115, were left behind, corresponding to an average statistical molecular weight of approximately 970 (X=7.5).

Example 1.2

Basic polyether of N,N-di-2-hydroxyethyl-n-butylamine:

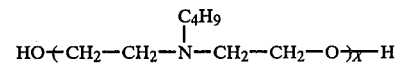

1.932 g (12 mol) of N,N-di-2-hydroxyethyl-n-butylamine and 5 g of 73% phosphorous acid ($H_3PO_3$) were condensed under nitrogen at 220 to 230° C. for 32 hours with the removal of 240 g of a water-amine mixture. Condensation was then completed at 20 mbar/230° C. with the removal of 137 g of amine by distillation. 1,520 g of a yellow oil, $n_D^{20}$ 1.4730, OH number 142, were left behind, corresponding to an average molecular weight of about 790 (X=5.5).

Example 1.3

Basic polyether of N,N-di-2-hydroxyethylcyclohexylamine:

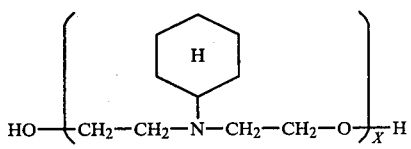

1,870 g (10 mol) of N,N-di-2-hydroxyethyl-cyclohexylamine and 9 g of 73% phosphorous acid ($H_3PO_3$) were condensed under nitrogen for 8 hours at 220 to 230° C. with the removal off 194 g of a water-amine mixture by distillation. A further 50 g of yellow oil were subsequently distilled off at a reduced pressure of 20 mbar. 1,600 g of a viscous oil, $n_D^{20}$ 1.5072, OH number 23, were left behind, corresponding to an average statistical molecular weight of 4,900 (X=29).

Example 1.4

A basic polyether of the same type as 1.3 but with a different OH number was obtained when condensation was carried out for 20 hours, using 4 g of 73% $H_3PO_3$. 1,670 g of a yellow oil, $n_D^{20}$ 1.5040, OH number 102, were obtained, corresponding to an average statistical molecular weight of 1,100 (X=6.5).

2. Preparation of salts of basic polyethers and benzoic acid

Example 2.1

130 g (1 equivalent of amine nitrogen) of the basic polyether of Example 1.1 were stirred up with 61 g (0.5 mol of benzoic acid at 80° C. under a nitrogen atmosphere for 30 minutes. A brown, viscous oil was obtained. Statistically, every second nitrogen atom of the basic polyether had been converted into the benzoic acid salt.

Example 2.2

130 g of the basic polyether of Example 1.1 were similarly stirred up with 122 g (1 mol) of benzoic acid, and a brown, viscous oil was formed. Statistically, every nitrogen atom was converted into the benzoate.

Example 2.2 a

A compound in which statistically $\frac{3}{4}$ of the nitrogen atoms were converted into the benzoate was prepared by a similar method to that described under 2.2.

Example 2.3

143 g (1 equivalent of amine nitrogen) of the basic polyether of Example 1.2 were stirred up with 122 g (1 mol) of benzoic acid for 30 minutes at 80° C. A yellow, viscous oil was obtained in which statistically every nitrogen atom had been converted into the benzoate.

Example 2.3 a

A compound in which statistically $\frac{3}{4}$ of the nitrogen atoms had been converted into the benzoate was prepared by a method similar to that of Example 2.3

Example 2.4

170 g (1 equivalent of amine nitrogen) of the basic polyether of Example 1.4 were stirred up with 122 g (1 mol) of benzoic acid for 30 minutes at 80° C. under nitrogen. A viscous, yellow oil was obtained in which statistically every nitrogen atom had been converted into the benzoate.

Example 2.4 a

A compound in which statistically $\frac{3}{4}$ of the nitrogen atoms had been converted into the benzoate was prepared by a method similar to that of Example 2.4.

3. Preparation of salts of basic polyethers, benzoic acid and oleic acid

Example 3.1

130 g (1 equivalent of amine nitrogen) of the basic polyether of Example 1.1 were mixed with 113 g (0.4 mol) of oleic acid and 61 g (0.5 mol) of benzoic acid for 30 minutes at 80° C. A brown, freely flowing oil was obtained in which statistically every second nitrogen atom had been converted into the benzoate and 2/5th of the nitrogen atoms into the oleate.

Example 3.2

A salt in which statistically every second nitrogen atom had been converted into the benzoate and 2/5th of the nitrogen atoms into the oleate was prepared by the method of Example 3.1 from the basic polyether of Example 1.2, oleic acid and benzoic acid.

Example 3.3

A salt in which statistically every second nitrogen atom had been converted into the benzoate and 2/5th of the nitrogen atoms into the oleate was prepared from the basic polyether of Example 1.4, oleic acid and benzoic acid by the method of Example 3.1.

4. Examination of salts of the general formula (I) for their corrosion-inhibiting action in elastomers was carried out in nitrile rubber (NBR) vulcanisates against SAE steel 1020 by the known Corrosion Test for Seal Compounds: GM 9003-P described as Engineering Standard by General Motors in November 1963, page W-281.101.

The vulcanisates to be tested were made up into test samples measuring 10×10×3 mm which were clamped between two SAE 1020 steel plates measuring 25×50×5 mm. The test samples were deformed by 10% by means of two screw devices.

These test units were kept in a dessicator over distilled water for 4 days at 40° C. The units were then opened up and the test samples removed and the corrosion picture, if any, formed on the steel surfaces was assessed.

Assessment was carried out visually by comparison with a calibrated scale in the form of a photograph of actual corrosion pictures. Two determinations were carried out in each case and in addition a standard material was tested twice with each series. The assessment grades and corresponding pictures may be described as follows:

0—no change in metal surface visible to the naked eye.

0.5—isolated, barely visible dots.

1—isolated, barely visible dots grouped together to a dotted line which in some places is interrupted.

2—barely visible dots showing the outline of the covering of the test body.

3—clearly visible dots clearly showing the outline of the covering on the test body.

4—same as 3 but the dots are substantially larger and in some cases touch each other.

5—same as 4 but the dots are even larger and in some cases form small, patch-like areas.

The vulcanisate to be teste may consist of a ready made sealing material or merely a cross-linked rubber.

The following test formulation was employed:

| butadiene-acrylonitrile copolymer | 100.0 parts by weight |
| Stearic acid | 0.5 parts by weight |
| ZnO | 3.0 parts by weight |
| TMTD (Tetramethylthiuram. disulfid) | 1.5 parts by weight |
| Optionally corrosion inhibitor | 1.0 part by weight |

Preparation of the mixture was carried out in known manner on a scrupulously clean rolling mill. Vulcanisation was carried out on plates 3.0 mm in thickness for 30 minutes at 150° C. between Teflon ® foils in a press.

The surface of the test steel was ground, polished and degreased after each test.

Any metal surfaces not required for the corrosion test were not nickel-plated.

The following results were obtained:

| Compound according to Example | Assessment |
| --- | --- |
| without additive | 3.5 |
| 2.1 | 1 |
| 2.2 | 0.5 |
| 2.2 a | 0.5 |
| 2.3 | 1 |
| 2.3 a | 0.5 |
| 2.4 | 0.5 |
| 2.4 a | 0.5 |
| 3.1 | 0.5 |
| 3.2 | 0–0.5 |
| 3.3 | 0–0.5 |

The following compounds of U.S. Pat. No. 4,051,066 (=German Offenlegungsschrift No. 2,600,989) were tested for comparison:

| Compound | Assessment |
| --- | --- |
| Cyclohexamethylene-imine-dinitro-benzoate | 2 |
| N,N—di-2-hydroxypropyl-N—methyl-ammonium-benzoate | 5 |
| N—butyl-N,N—di-2-hydroxyethyl ammonium-benzoate | 2.5 |
| N—cyclohexyl-N,N—dihydroxyethyl-ammonium-benzoate | 3 |

It is seen that compounds used according to the invention develop a substantially improved corrosion-inhibiting action.

We claim:

1. An elastomer having corrosion-inhibiting properties, the elastomer containing a reaction product of an amine of the formula:

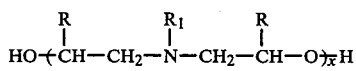

wherein
X represents a number from 5 to 30,
R denotes hydrogen or $C_1$-$C_6$ alkyl, and
$R_1$ denotes $C_1$-$C_{18}$ alkyl, $C_5$-$C_6$ cycloalkyl or $C_7$-$C_8$ aralkyl,
with an aromatic carboxylic acid and optionally a fatty acid.

2. An elastomer according to claim 1, containing a reaction product prepared using an aromatic $C_6$-$C_{12}$ carboxylic acid.

3. An elastomer according to claim 1, containing a reaction product prepared from an aromatic $C_6$-$C_{12}$ carboxylic acid and a $C_8$-$C_{20}$ fatty acid.

4. An elastomer according to claim 1, containing a reaction product which contains, per nitrogen equivalent of the amine, from 0.2 to 1 mol of aromatic carboxylic acid and from 0 to 0.8 mol of fatty acid.

5. An elastomer according to claim 1, containing a reaction product which contains, per nitrogen equivalent of the amine, from 0.4 to 1 mol of aromatic carboxylic acid and from 0 to 0.6 mol of fatty acid.

6. An elastomer according to any of claim 1 to 5, containing from 0.1 to 10% by weight of the reaction product.

7. An elastomer according to claim 6, containing from 0.5 to 3% by weight of the reaction product.

8. A process for the preparation of an elastomer having corrosion-inhibiting properties, which comprises adding a reaction product of an amine of the formula:

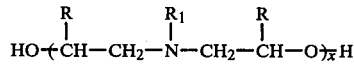

in which X, R and $R_1$ have the meaning indicated in claim 1, with an aromatic carboxylic acid and optionally a fatty acid, to the elastomer as a corrosion-inhibitor during preparation, manufacture or processing to the end product.

* * * * *